UNITED STATES PATENT OFFICE.

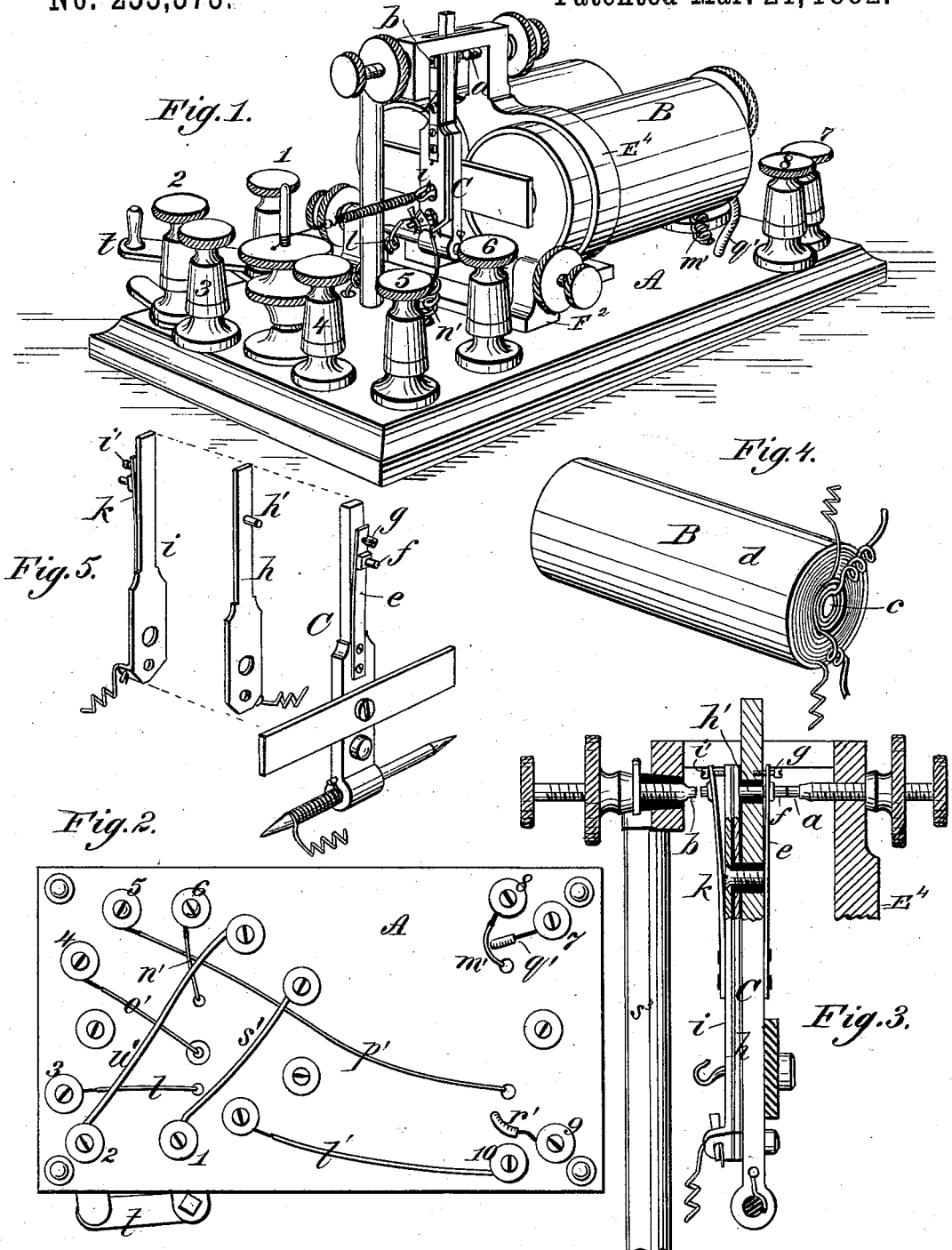

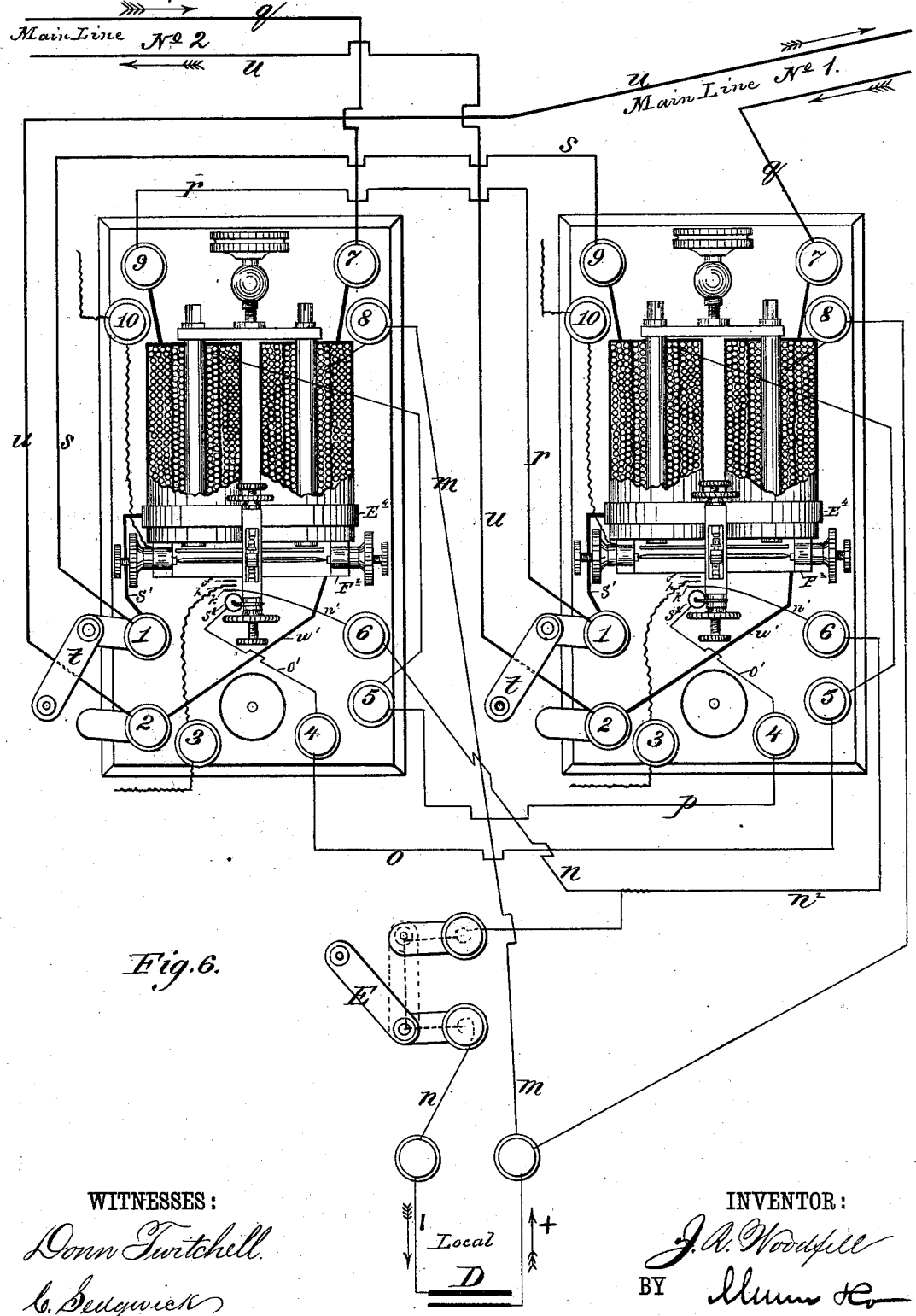

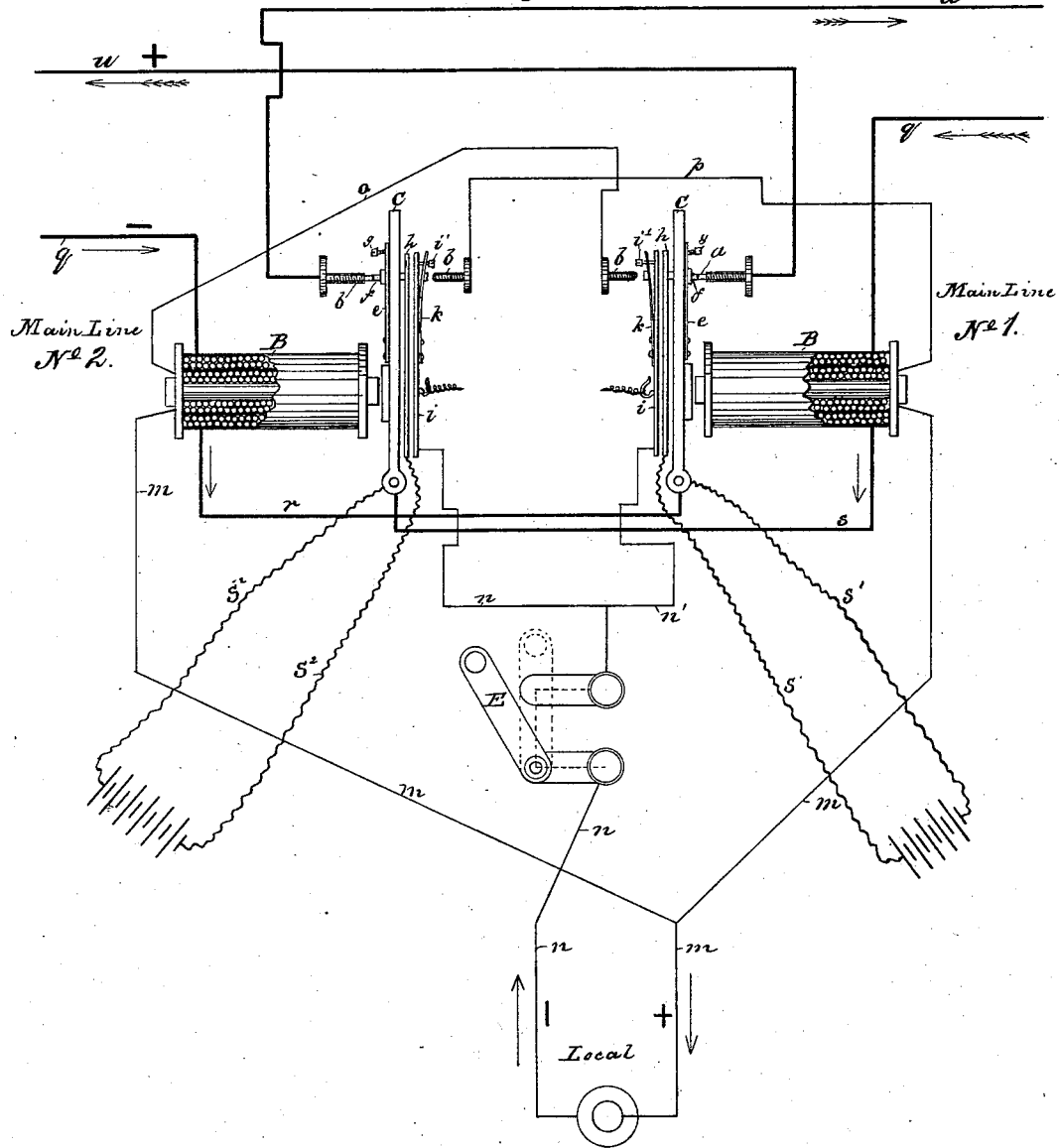

JARED R. WOODFILL, OF AURORA, ASSIGNOR TO JOHN I. WOODFILL, OF NICHOLS, MISSOURI.

TELEGRAPH RELAY AND REPEATING-INSTRUMENT.

SPECIFICATION forming part of Letters Patent No. 255,373, dated March 21, 1882.

Application filed October 27, 1881. (No model.)

*To all whom it may concern:*

Be it known that I, JARED R. WOODFILL, of Aurora, in the county of Lawrence and State of Missouri, have invented a new and Improved Relay and Repeating-Instrument; and I do hereby declare that the following is a full, clear, and exact description of the same, reference being had to the accompanying drawings, forming part of this specification.

My invention relates to certain improvements upon that form of repeating-instrument in which the instrument for each line has a magnet with independent helices about the same core, one of which helices in each instrument is charged by their respective main-line circuits, and the other of which helices is charged by a local-battery current, and in which each instrument is provided with two sets of contacts controlled by the armature-lever of that instrument, one of which set of contacts in the first instrument controls the second main circuit in the other instrument, and the other of which set of contacts in the first instrument controls the local battery in the second instrument, and in which the two sets of contacts of the second instrument act reciprocally to the first in the same way to produce the same result.

In all the repeating devices used in this country there is used a battery force of several cells for each instrument, and the battery force for two instruments are separate and distinct features and have to be kept in equal tension, and if two or more batteries become of unequal tension by reason of difference in temperature or by unequal quantities of chemicals used the main lines are thrown open, or the instruments will not break over, and the repeating stops until the batteries are made of equal tension. I overcome this defect by using in connection with the general system already described one local battery of one cell for two instruments, and by the automatic devices hereinafter described this local circuit, whole and entire, is thrown through the inner helix of one machine and then through the other at the instant the change is needed, thereby securing certainty of action and cheapness and simplicity and an equal tension of battery force in each instrument.

My invention also consists in the peculiar construction of the magnets in the general system described for enabling a single-celled local battery to do the necessary work; and, also, further, in the peculiar construction of the spring-contacts and of the armature-lever and switches for permitting the repeating-instruments to be used separately as ordinary relays in connection with separate sounders, as will be hereinafter more fully described.

Figure 1 is a perspective view of one of my instruments. Fig. 2 is an underneath view of the base-board, showing the connecting-wire for the binding-posts and various parts of the instrument. Fig. 3 is an enlarged sectional view, in detail, of the armature-lever with spring-contacts carried thereby and the stationary contacts on opposite sides of the same. Fig. 4 is a detail view, in perspective, of the compound magnet. Fig. 5 is a view of the parts carried by the armature-lever shown detached. Fig. 6 is a plan view of two instruments and a local battery connected for repeating, and showing also diagram of the circuits outside of the armature-levers; and Fig. 7 is a diagram view, showing the relation of the circuits to the contact-points of the armature-lever.

The mechanical construction is as follows:

A is the base of the instrument, provided with binding-posts 1 to 10. B is the magnet. C is the armature-lever, fitted to vibrate between the front point, $a$, and back point, $b$, insulated as shown in Fig. 3. The magnet has compound helices, each composed, as shown in Fig. 4, of an inner helix, $c$, and outer helix, $d$, both wound in the same direction. Hence they are not differential. The inner helix, which extends the whole length of the core, consists of four or more convolutions of insulated wire, and the outer one of insulated wire wound to the required extent, both being connected, as hereinafter described.

The armature-lever C, as shown in Figs. 3 and 5, has upon its inner side a tongue-spring strip, $e$, of copper, that is attached at one end by a screw, and at its moving end is provided with a platinum point, $f$, for contact with the point $a$. A set-screw, $g$, passing loosely through tongue-spring $e$ into the armature, serves to limit its space of movement from the armature when the armature is drawn back by the adjusting-wire, as shown in drawings.

On the back of the armature is fixed an insulated plate, $h$, for a circuit-carrier, provided with a platinum pin, $h'$, that extends through the armature for contact with rear end of the platinum point on tongue-spring $e$, and screwed on the plate $h$ is a second plate, $i$, carrying another tongue-spring, $k$, that has a platinum point for contact with the back point, $b$. A set-screw, $i'$, tapped into plate $i$, regulates and limits the motion of tongue-spring $k$ and releases the contact of platinum point $b$ in the forward movement of the armature. The plates $h$ and $i$, being circuit-carriers of independent circuits, are insulated from each other and from the armature, as shown in Fig. 3.

To make the different circuits more clearly distinguishable in the drawings, I have represented the main-line circuits by heavy black lines, the local circuits by light lines, and the connections for the sounders (when the instruments are not used as repeaters) I have shown by waved lines.

The connections on the instrument are as shown in Figs. 1, 2, and 6. The binding-posts 3 and 10 are for the connections of local-sounder circuits when the machines are disconnected and used as relays simply. Post 3 is connected by wire $l$, Fig. 2, to plate $h$, Fig. 3, and post 10 by wire $l'$, Fig. 2, to frame $F^2$ of instrument, which carries circuit to point $f$. For the circuits of the local battery, posts 8 and 5, Fig. 6, receive the outer ends of the wire from the inner helix. From post 8 there is a wire connection, $m$, to positive pole of the local battery D, that works the inner helices of two instruments in different lines. Posts 5 are connected with posts 4 on opposite instruments by lines $p$ and $o$, and post 4 of each instrument is connected with point $b$ by wire $o'$ passing up the hollow of gutta-percha tube $S^3$. Posts 6 are connected together, (see Fig. 6,) and also connected by wire $n'$, Figs. 2 and 6, to plate $i$, Figs. 1 and 3, which carries the circuit to tongue-spring $k$, thence to platinum on this spring, and when armature on instrument No. 1 is drawn back makes contact with point $b$, completing the local circuit of battery D through wire $n$, switch E, (when closed,) $n^2$ 6 $n'$ $o'$ 4 $p$ 5, the inner coil of the opposite instrument, and wire $m$ to battery again. When armature of instrument No. 2 is drawn back, then the local-battery current flows to 8 in instrument No. 1, through inner helix of that instrument, then to 5, to $o$, to 4, (on instrument No. 2,) to $o'$, to $b$, to $k$, to $n'$, to 6, to $n$, switch E, and to battery again.

Having given the completion of the circuit from local battery D, and the manner in which it may pass through either of the two instruments without dividing the circuit, and avoiding all duplex or quadruplex principles, by keeping the circuit whole and entire, I now proceed to give the direction of the main-line circuits.

Post seven (7) receives the positive ends of the main line coming into the office, and the main-line circuit passes from post 7, through the outer helix of that instrument, to post 9 of same instrument, thence to post 1 of the other instrument by wire $s$, thence by wire $s'$ to the brass frame-work $E^4$ of the instrument to point $a$. Thence (when the armature is drawn forward by the magnetic force of the main-line circuit passing through the outer helix, point $f$ being brought in contact with point $a$) the circuit passes down the armature C, thence by wire $u'$ to post 2, thence to main line on ground-wire to either, as the case may require. The circuit of main line No. 2 flows in a like manner to 7, through outer helix of magnet to 9, through $r$ to 1 of first instrument, thence to metal frame $E^4$, thence (when armature is closed) to $F^2$, thence through $u'$ to 2, and thence to main line or ground.

*How they work as repeaters.*—As telegraphic signals are made by closing and breaking electric circuits, it will only be necessary to show how the different circuits are broken and closed on one machine and the effects produced on the circuits of the other machine when this is done.

Referring to Fig. 7, Sheet No. 3, which more clearly shows the diagram of circuits in relation to the contact-points of the armature, I call the right-hand part of this figure machine No. 1, receiving main line No. 1, and the left machine No. 2, receiving main line No. 2. When both machines are at rest, as shown in this figure, and the main circuits passing through their respective outer coils of each machine, the magnetic force of the main circuits hold the armatures forward and points of contact $a$ and $f$ closed, and at same time all the wires running from local battery D are dead—that is, they carry no circuit. Local battery D, which works the inner helix of both machines, is an open-circuit battery, and its circuit is passed through inner helix of machine No. 2. Whenever armature C of machine No. 1 falls back and makes contact at point $b$ on said machine No. 1 in the manner described, and the same is true with inner helix of machine No. 1 when armature C of machine No. 2 falls back and makes the point of contact, the local circuit of battery D passes through it. Now, when any operator on main line No. 1 opens his key his main line is broken and the magnetic force of machine No. 1 is broken, and armature C of that machine falls back by means of an ordinary adjusting-cord, and by breaking contact at point $a$ it breaks main circuit No. 2; but just before point $f$ leaves point $a$ the spring-contact $k$ closes on $b$ and throws the local batttery D through the inner helix of machine No. 2, producing a continuation of magnetic force on machine No. 2, holding its armature C closed during the interval that its main circuit is broken to prevent main line No. 1 from being opened at point $a$ on machine No. 2. It will be seen, therefore, that there is a time in the movement of the armature-lever when both the contacts *a* and *b* are closed by the spring-contacts *f* and *k*. The same is true in regard to the working of machine No. 2 on main line No. 2. When operator on line No. 2 wishes to break the operator on line No. 1 and send signals back he opens his key, and the operator on No. 1, as soon as he brings his key down to contact, finds his own line open, and at same time armature on machine No. 1 is held closed by action of same battery, D, ready to receive signals from line No. 2. This manipulation may be done at any point on lines Nos. 1 and 2, and signals may be sent and received from one line to another as perfectly and as firmly as if both operators were working on same circuit.

*How they work as relays.*—The device arranged for the conversion of the relay-repeaters into ordinary relays consists of two switches, *t*, and one switch, E—switch *t* in relay No. 1 to cut main line No. 2 out of machine No. 1 and cause it to pass from post 1 to post 2, one switch *t* in main line No. 2 to cut main line No. 1 out of machine No. 2 and cause it to pass from post No. 1 to post No. 2, and one switch, E, on negative wire from local battery D, to break the circuit from this battery and prevent induction-circuits in the inner helices of the two machines. When the two switches *t* are closed and switch E opened the inner coils are dead and the two machines become ordinary relays, each working in its respective line and through the outer helices. In this form of compound magnet the switch E is a very necessary adjunct for the separate working of the instruments as simple relays, for if the local circuit were closed, even without any current from the battery, the main-line current would produce by induction in the inner helix a secondary current, which would greatly weaken the attractive power of the magnet and involve irregular and uncertain action.

When working the instrument as separate relays the wires for the sounder connect at *s'* *s'* in machine No. 1 and at *s² s²* in machine No. 2, and here will become apparent the value of the insulated plate *h* and its pin *h'* working through the armature-lever, for every time the armature is attracted by the main-line impulses the sounder-circuits are completed through the lines *s' s'* and *s² s²* in the two instruments by traversing plate *h*, pin *h'*, contact *f*, and armature-lever.

In defining certain features of my invention with greater clearness, I would state, with respect to my peculiar form of magnet, that I am aware that this form of magnet, with two separate helices, one within the other, is not broadly new, as it may be found in induction-coils; and I am aware, also, that two separate helices have been arranged upon opposite ends of the core in connection with a similar set of devices for repeating, as shown in the patent to Haskins, May 30, 1871, in which two local batteries are used.

By using the form of magnet shown, with one helix within the other, I find that a very weak battery of a single cell is amply sufficient for charging the inner helix, by reason of the fact that at a given time there are two currents in the same direction in the same magnet at the same time, and when the main current in the outer helix is broken the weak current of the single battery is sufficient for retaining the magnetism of that core and holding the armature up. It will be seen, also, that this single battery of one cell is connected so as to coact with both instruments, thereby avoiding difficulties arising from differences in the tension of two local batteries.

In respect to the tongued-spring contacts it will be seen, also, that when a contact is made the first pressure between the contacts is simply the tension of the spring; but as the armature makes its full movement then tongue-spring is backed up by the armature-lever with a solid bearing, that avoids all sputtering or breaking of the current from an imperfect vibrating contact.

Now, in so far as an armature bearing a tongued spring on each side is concerned for making contacts, I do not claim this broadly, but only this when combined with a repeater constructed and operating like mine. In defining this feature of my invention with greater clearness, I would state that I do not claim broadly the location of a spring upon the armature-lever in such a system of repeating as is described; and I am aware of the fact that an armature-lever has been arranged between front and back contacts without springs. My invention in this connection consists in combining with front and back contacts, *a* and *b*, (one of which connects with one of the main lines and the other with the local circuits,) an armature-lever having tongued-spring contacts *e* and *k*, which at one point in the movement of the armature tie over or hold both contacts *a* and *b* closed, and at the end of each stroke cause the tongue-spring to be forced flat and solid against the contact by the armature to prevent chattering or sputtering in the closure of the circuit. Both these results are absolutely necessary to the proper working of my invention, for, as before stated, there must be a period of time in which both circuits (main and local) are closed through *a* and *b*, and then when the armature goes its full distance the terminal contact wants to be solid and unbroken to let an undisturbed flow of current through. If any other arrangement of spring were used than one backed up by the armature, the contact-points would vibrate over each other and produce vibrating impulses in the current that would be inconsistent with this system of repeating. By my invention I not only secure the holding of the front and back contacts closed temporarily, but get a solid, positive, and unbroken closure of the terminal contact, because as the armature moves up against the spring it forms a solid backing that precludes all sputtering, chattering, or vibrating action.

Having thus described my invention, what I claim as new is—

1. A repeating-instrument consisting of the combination of a magnet having separate inner and outer helices wound in the same direction throughout the length of the core, and an armature having front and back contacts, both of which are closed at one point in the movement of the armature, the inner helix of each instrument being connected to a local battery and its circuit broken through one of the contacts of the armature of the other instrument, and the outer helix of each instrument being connected with their separate main lines and their circuits broken by the other armature-contact on the opposite instruments, substantially as described, and for the purpose of repeating with a weak or single-cell battery.

2. The combination, with two or more instruments having compound magnets B formed of two separate helices wound in the same direction throughout the length of the core, and armature-lever contacts for making and breaking the circuits, as described, of a single local battery connected with the inner helix of each instrument and arranged to be thrown alternately through the said inner coils of the instruments in an automatic manner, as described, to avoid differences in tension, as set forth.

3. The combination, with the compound magnet B, having separate inner and outer coils, and its armature with contacts for repeating, as described, of a local battery connected with the inner coil of the magnet, and a switch arranged in the local-battery circuit, arranged to break the circuit of the inner coil, to avoid inductive effects when the instruments are worked separately as relays.

4. The combination, with two repeating-instruments having magnets with separate inner and outer helices for the main and local circuits, respectively, and a stationary front and back contact for each instrument, arranged respectively in one of the main-line circuits and the local circuit, of an armature vibrating between the two stationary contacts, and having itself spring-contacts, arranged as described, to temporarily hold both front and back stationary contacts closed, and finally to be backed up by the armature-lever for a solid bearing and positive unbroken closure of the contact, toward which the armature moves, as described.

5. The combination, with an armature-lever having a hole through it, a tongue-spring contact on one side and an insulated plate, $h$, with pin $h'$ on the other, the said pin $h'$ being arranged to close a sounder-circuit through the tongue-spring by the pressure of the tongue-spring against a stop when the armature is drawn by a magnet controlled by a main circuit, as described.

JARED RYKER WOODFILL.

Witnesses:
J. M. GRAMMER,
H. M. SHERWOOD.